United States Patent
Zhang et al.

(10) Patent No.: US 10,762,438 B1
(45) Date of Patent: Sep. 1, 2020

(54) EXTRACTING QUESTIONS AND ANSWERS (71) Applicant: Facebook, Inc., Menlo Park, CA (US)

(72) Inventors: Ying Zhang, Turlock, CA (US); Irina-Elena Veliche, Menlo Park, CA (US); Benoit F. Dumoulin, Palo Alto, CA (US); Aram Grigoryan, San Ramon, CA (US); Wenhai Yang, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 822 days.

(21) Appl. No.: 15/199,915

(22) Filed: Jun. 30, 2016

(51) Int. Cl.
*G06N 20/00* (2019.01)
*G06N 5/02* (2006.01)

(52) U.S. Cl.
CPC ............ *G06N 20/00* (2019.01); *G06N 5/022* (2013.01)

(58) Field of Classification Search
CPC .............................. G06N 20/00; G06N 5/022
USPC .......................................................... 706/12
See application file for complete search history.

(56) References Cited

U.S. PATENT DOCUMENTS

| | | | | |
|---|---|---|---|---|
| 2008/0294637 A1* | 11/2008 | Liu | ......... | G06Q 30/02 |
| 2013/0173725 A1* | 7/2013 | Ventilla | ......... | G06Q 10/10 709/206 |
| 2013/0317808 A1* | 11/2013 | Kruel | ......... | H04L 51/32 704/9 |
| 2014/0149121 A1* | 5/2014 | Di Fabbrizio | ......... | G10L 21/00 704/270.1 |
| 2014/0297754 A1* | 10/2014 | Ross | ......... | G06Q 10/10 709/204 |
| 2016/0171373 A1* | 6/2016 | Allen | ......... | G06F 16/907 706/50 |
| 2016/0196561 A1* | 7/2016 | Iyer | ......... | G06Q 30/016 705/304 |
| 2016/0292204 A1* | 10/2016 | Klemm | ......... | G06F 16/3329 |

OTHER PUBLICATIONS

Liu et al., "Using Stranger as Sensors: Temporal and Geo-sensitive Question Answering via Social Media", WWW 2013, May 13-17, 2013, Rio de Janiero, Brazil. (Year: 2013).*
Liu et al., "Using Stranger as Sensors: Temporal and Geo-sensitive Question Answering via Social Media", WWW 2013, May 13-17, 2013, Rio de Janiero, Brazil. (Year: 2013). (Previously Supplied).*
U.S. Appl. No. 15/199,931 by Zhang, Y, et al., filed Jun. 30, 2016.

* cited by examiner

*Primary Examiner* — Dave Misir (57) ABSTRACT

A system for answering user questions can provide answers from a knowledge base that stores question/answer pairs. These pairs can be associated with characteristics of the asking user so that, when subsequent users ask similar questions, answers can be selected that have been identified as most relevant to that type of user. The question/answer pairs in the knowledge base can be identified from social media posts where the original post contains a question and one or more comments on the post provide an answer. Posts can be identified as containing a question using a question classification model. A post comment can be identified as an answer based on: whether the question poster responded positively to the comment, whether the comment has similar keywords to the question, whether the comment has the characteristics of an answer, and how often a similar answer has been provided for similar questions.

19 Claims, 6 Drawing Sheets

EXTRACTING QUESTIONS AND ANSWERS

BACKGROUND

As technology and the Internet become integrated into every facet of people's lives, the way people interact with these technologies is changing. Instead of manually logging scores we wear devices to count steps, heart rate, and UV exposure; instead of taking notes, we receive automatically synthesized summaries; instead of performing a web search and sifting through results, we ask our digital personal assistant to fetch an answer to our questions. Many digital content producers, social media providers, search engine providers, cell phone providers, and operating system providers have released various automated systems for retrieving relevant data, whether it is explicitly asked for by a user or whether a system intuitively determines that a user will find such data useful. As an example, some cell phones include automated systems that allow a user to pose a question and receive an answer in a conversational manner.

While these automated systems have attained a great deal of notoriety, this notoriety is as often a result of failures as it is from successes. Users of these systems have to deal with the occasional inability of the system to obtain answers to their questions or incorrect or even absurd results. There are a variety of reasons for these shortcomings. In some cases, the problem comes down to a lack of available data. When a user asks a question that the automated system has not seen before, it may fall back on a default operation such as a web search. In some cases, the problem arises from an inability to properly categorize available data. When a question is asked that is similar to a previously identified question, the system may not be able to correctly determine a correspondence between the questions, and thus may not correctly provide an answer. In some cases, the problem is an overabundance of data without an ability to properly identify a context. For example, a user can ask the question "where should I go for lunch?" The system can provide any of many known answers, but some of these may not be relevant to the particular user asking the question.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Embodiments for extracting question and answer pairs from content items such as social media posts, and using the question and answer pairs to respond to user questions, are described. The automated response system described herein can obtain question and answer pairs (referred to herein as "Q&A pairs") from sources such as social media posts and associated comments, messages and corresponding responses, search requests and selected search results, etc. The automated response system can store identified Q&A pairs in a knowledge base. In some implementations, the Q&A pairs can be stored with identifiers for the context of the question or answer. In some implementations, these identifiers can identify characteristics of the asking user so that, when subsequent users ask similar questions, answers can be selected that have been identified as most relevant to that type of user. In some implementations, Q&A pairs can be stored with an identified type of the question.

The automated response system can identify content items, such as social media posts, as containing a question either by training a classification model to identify questions or by using an algorithm that can identify content item characteristics for having questions. These characteristics can include punctuation, question keywords (e.g. who, what, where, etc.), or grammatical structure. In implementations where a question classification model is trained, the algorithm that can identify content item characteristics for having questions can be used to identify training items. Alternatively or in addition, questions can be manually identified, such as by human review of a set of social media posts or by tags applied by a social media poster (e.g. as a result of a post being provided to a module designed to answer questions.). In some implementations, the automated response system can identify questions as having a factual type (e.g. a question that has a universal specific answer such as "What is the gradational constant of Earth?") or a recommendation type (e.g. a question whose answer is dependent on characteristics/context the asker such as "What type of car should I buy?" or "What is the closest gas station?"). When the question is a recommendation type, identifiers of a context of the question and asker of the question can be stored with the Q&A pair, such as location, source, asker age, gender, profession, primary location, education level, relationship status, social media usage, friends, etc. In some implementations, questions can be associated with a category, which can be identified from keywords or entities identified in the question or based on the question asker. Additional details about identifying questions are provided below in relation to FIG. 4.

For identified questions, the automated response system can examine associated data to select a best answer to store with the question as a Q&A pair. For example, where the question is identified in a social media post, answers can be selected from comments on that post. The automated response system can determine, from associated data, the best answer for an identified question based on a combination of factors or scores such as an answer-type score for a potential answer, a questions similarity score for the potential answer, a comment score for the potential answer, a frequency score for the potential answer, or any combination thereof. In some implementations, an answer-type score can be computed by identifying characteristics of a data item as matching the characteristics of answers generally. Such characteristics can be: grammatical structure, word types, phrases, etc. In some implementations, a question similarity score can be a score assigned based on a correspondence of words or phrases between the identified question and the potential answer. For example, the question similarity score can identify the same words used between the identified question and the potential answer, can identify words/ phrases in an identified category between the identified question and the potential answer (e.g. "food" in the identified question and "eat" in the potential answer), or can identify a hierarchical relationship between words in the identified question and the potential answer (e.g. a class/sub-class relationship between the identified question and potential answer words, such as "car" in the identified question and "Honda" in the potential answer). In some implementations, a comment score can be based on how the question author or others have interacted with the potential answer. For example, the comment score can increase when a user likes, shares, or comments on a particular potential answer. Such actions can be weighted more heavily if they are performed by the question author. In some implementations, a frequency score can be assigned to a potential answer based on how often (count or ratio) that answer has been provided for a similar question as more common answers are more likely to be correct. Potential answers with a combined score above a threshold, or the potential answer with the best score, can be selected as the answer to the identified question. In some implementations, multiple potential answers can be selected, making multiple Q&A pairs, which can be associated with different contexts. Additional details about identifying answers to a question are provided below in relation to FIG. 5.

Once a Q&A pair has been identified, it can be stored in a knowledge base to be used to answer similar questions in the future. When the automated response system receives a new question, it can determine whether a sufficiently similar question exists in the knowledge base, and if the question is of the recommendation type, whether there is a Q&A pair for a user in a similar context as the asker. If so, the automated response system can select the Q&A pair with a question most similar to the asked question for a user sufficiently similar to the question asker to respond to the question. The response can be formatted in various ways such as by removing potentially private data or by linking the user to a site or identifying a social media entity. Additional details about using a knowledge base to answer a question are provided below in relation to FIG. 6.

Implementing a question/response system can include sophisticated technical algorithms such as methods for deconstructing and analyzing content items for question characteristics, methods for selecting training data and building classification engines, methods for selecting answers to questions, and methods for matching new questions to previously identified questions. The disclosed automated response system can improve question/response systems by providing more reliable and context specific answers to questions, increasing the trust and efficiency with which people can interact with technology.

Figure 1:
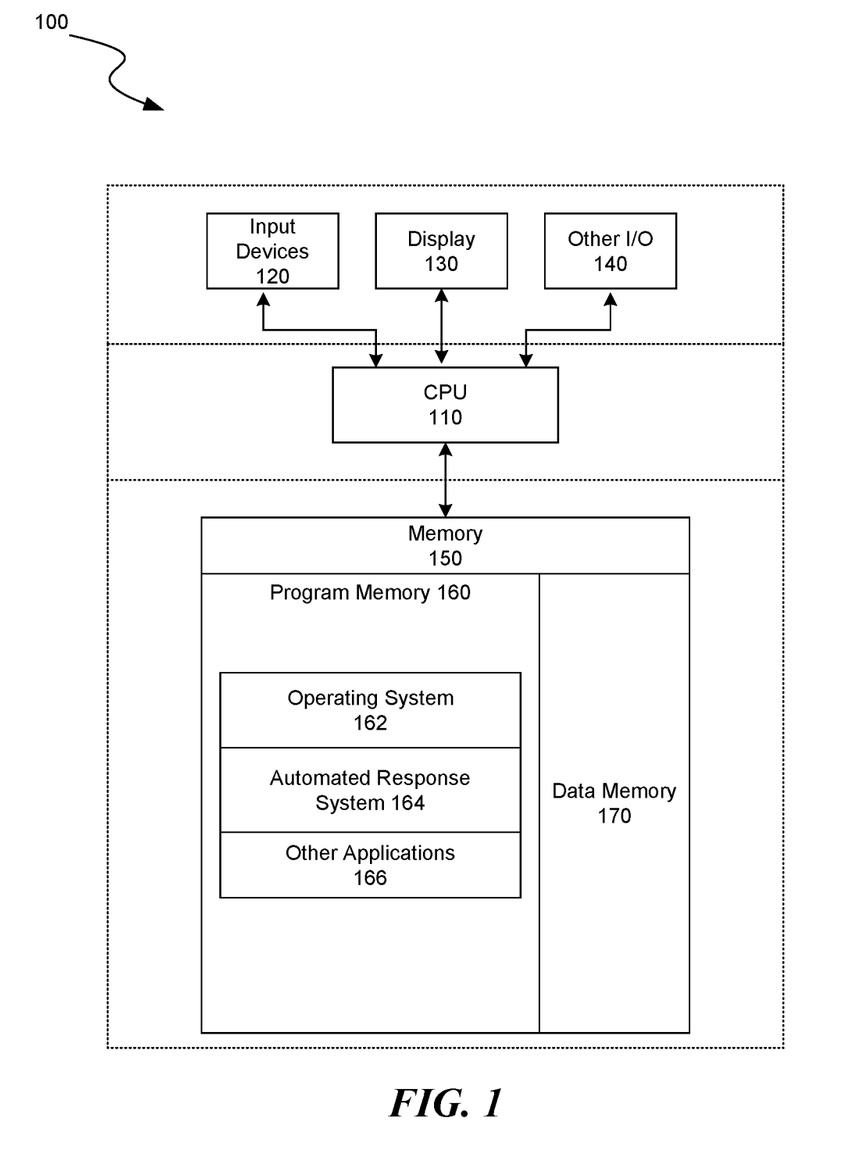
FIG. 1 is a block diagram illustrating an overview of devices on which some implementations can operate.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can identify and store question and answer pairs or that can use previously identified question and answer pairs to respond to a user question. Device 100 can include one or more input devices 120 that provide input to the CPU (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, automated response system 164, and other application programs 166. Memory 150 can also include data memory 170 that can include content items, training data, classifiers, algorithms for identifying questions and answers, user characteristics, comment scoring algorithms, question/answer statistics, Q&A pairs, configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
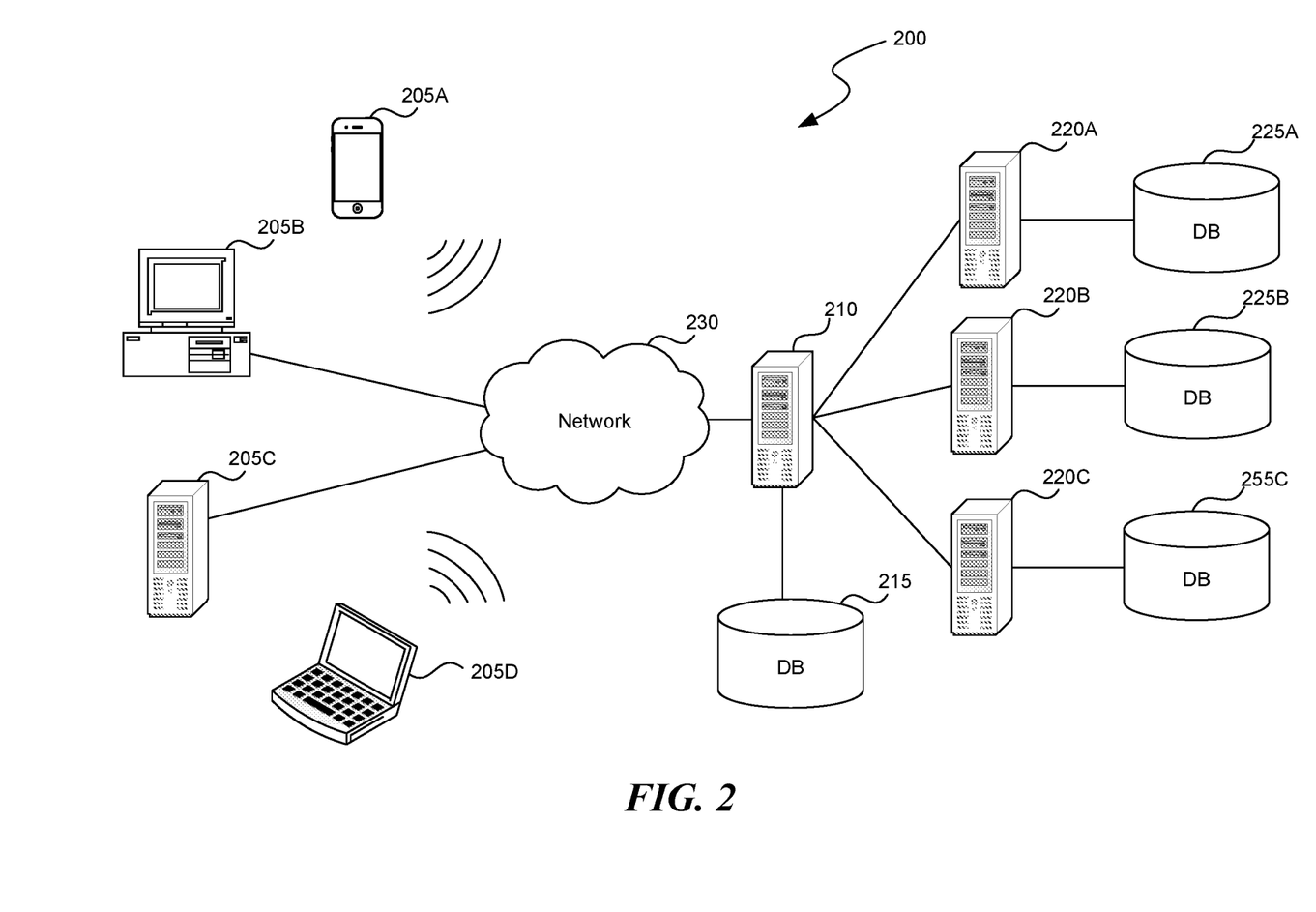
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information, e.g. information from/for computing devices 210. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
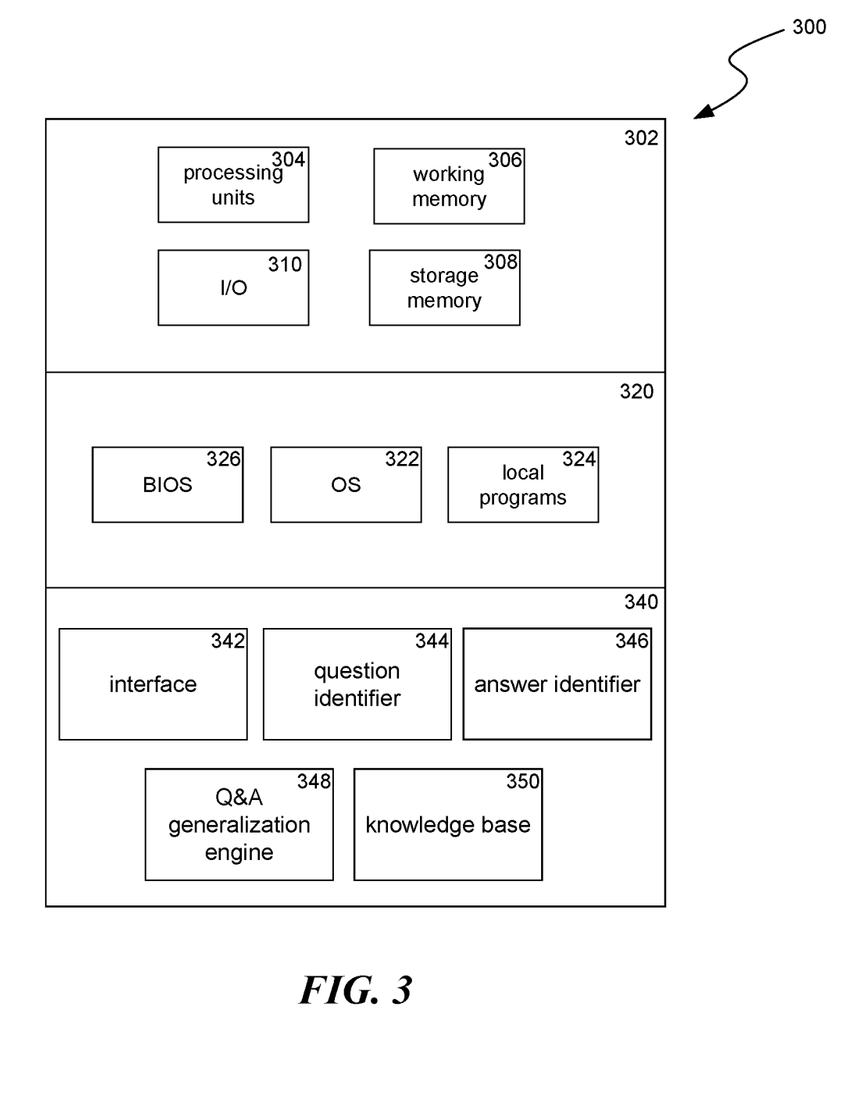
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include question identifier 344, answer identifier 346, Q&A generalization engine 348, knowledge base 350, and components which can be used for transferring data and controlling the specialized components, such as interface 342. In some implementations, components 300 can be in a computing system that is distributed across multiple computing devices or can be an interface to a server-based application executing one or more of specialized components 340.

Question identifier 344 can be configured to receive content items, such as social media posts, through interface 342, and can identify whether each content item contains a question. In some implementations, question identifier 344 can also determine a type associated with identified questions and context characteristics of the question or question asker. In some implementations, question identifier 344 can identify questions using an algorithm that matches question qualifications such as whether the content item has a question mark, whether the structure of the content item matches structures identified as a question, or whether the content item includes keywords indicative of a question. In some implementations, question identifier 344 can train a classifier to identify questions. In various implementations, a question classifier can be a neural network, support vector machine, decision tree, Parzen window, Bayes, cluster, reinforced learning classifier, probability distribution, or others. Training data for the classifier can be identified using the question algorithm described above. Alternatively or in addition, classifier training data can be identified manually. Question identifier 344 can also identify additional features associated with the question, such as characteristics of the question asker or attributes of a context in which the question was asked.

Answer identifier 346 can be configured to examine data associated with questions identified by question identifier 344 to determine if that data contains an answer to the identified question. In some implementations where question identifier 344 has identified a question in a social media post, answer identifier 346 can examine data related to the post such as comments on the post. In some implementations where question identifier 344 has identified a question in a message between users, answer identifier 346 can examine data related to the message such as replies later in the thread of the message. When examining the data related to an identified question, answer identifier 346 can analyze various aspects of each portion of the related data such as whether that portion is structured like an answer to a question, whether that portion has words related to the question, whether users have indicated that portion is useful (i.e. by liking it, sharing it, commenting on it, scoring it, etc.), or how often a similar answer has been given to a similar question. In some implementations, a score can be computed for one or more of these aspects, and a combination of these scores can be used as a final score for the portion of the related data. In some implementations, individual ones of these scores can be compared to a corresponding exclude threshold value, and if the score is below the exclude threshold, that portion of related data can be excluded from being an answer. In some implementations, individual ones of these scores can be compared to a corresponding include threshold value, and if the score is above the include threshold, that portion of related data can be identified as an answer, despite other scores. In some implementations, the final score for a portion of the related data can be used to select whether that portion of related data is an answer to the question. The automated response system can accomplish this by determining whether they final score is above a threshold or by selecting the portion of related data with the highest corresponding final score. In some implementations, only portions of the related data can be selected as a potential answer if the final score for that portion is at least above a threshold. In some cases, if multiple portions of related data are above the threshold, multiple Q&A pairs can be identified. Once a Q&A pair is identified, it can be added to knowledge base 350. In some cases, no portion of data related to a question may have a sufficiently high final score, in which case the automated response system can disqualify the identified question from being included in the knowledge base.

Q&A generalization engine 348 can be configured to generalize the information in a Q&A pair, such as by removing personal information, converting the question and/or the answer into an abstracted version, or converting the question and/or answer into a link or other entity identifier. In some implementations, abstracted versions of content items can be created by mapping the content item into a vector space and using the resulting vector as a representation of the content item. In some implementations, the procedure for mapping a content item into a vector space includes creating a dependency structure for the content item and computing a vector, in the vector space, for each node of the dependency structure. This can occur by iteratively taking the vectors of each word or lower layer edge in the dependency structure as input to a trained transformation function (e.g. a deep neural network) selected for the type of that node. The vector computed for the root node of the dependency structure is the vector for the content item. Additional details regarding creating an embedding of a content item are provided in U.S. patent application Ser. No. 14/878,794, entitled LANGUAGE INDEPENDENT REPRESENTATIONS and U.S. patent application Ser. No. 14/878,762, entitled DEEP TRANSLATIONS, each of which is incorporated herein by reference. In some implementations, portions of the Q&A pair can be saved in an abstracted version by extracting and storing salient features corresponding to a question template. For example, a question template for a recommendation type question can be <subject>, <type>, <location>, so for the question "What is the best burger joint in San Francisco?" the corresponding abstracted version of this question using the recommendation template would be "burger restaurant," "best," "San Francisco." In some implementations where a Q&A pair is identified from social media content, the question and/or answer can be converted into a social media entity identifier. For example, if the question is "who wrote the song Purple Rain?" and the answer is "Prince," the answer can instead be saved as an identifier for the artist Prince or as a link to a page dedicated to the artist Prince.

Q&A pairs identified using question identifier 344 and answer identifier 346 can be stored in knowledge base 350. In some implementations, some Q&A pairs can be stored with associated context and/or author data. For example, context data can indicate when the question or answer was provided, where the question or answer was asked, what type of device the question or answer originated from, a virtual area the question or answer was posted to, etc. Author data can include gender, age, date of birth, location (e.g. longitude/latitude, country, region, city, etc.) level of education, life stage, relationship status, first name, a model of devices typically used, languages identified as ones the user is facile with, occupation, a number of friends, which friends the user has, which friends-of-friends the user has, a number of friend requests the user has received, a number of subscribers to content produced by the user, a time the user created the content item, times the user typically accesses a social media website, whether the content item was from a phone/computer, whether the user typically accesses a social media website from phone or a computer, level of activity on a social media website, or etc.

When the automated response system receives a question from a user, it can check knowledge base 350 for a matching Q&A pair, and if one exists, provide the corresponding answer to the asking user. This can be accomplished by transforming the question using the Q&A generalization engine 348. For example, the question can be converted into a vector, or portions can be extracted corresponding to a template. In implementations where the question is converted into a vector, and question vectors are stored in the knowledge base 350, cosine differences can be computed between the question vector and the stored vectors to determine a most similar question in the knowledge base 350. Where the question is abstracted to match a template, the automated response system can determine whether corresponding portions of the asked question and stored questions match, and if so, provide the corresponding answer. In some implementations, determining a match between and asked question and a stored Q&A pair requires a correspondence between author/contextual data corresponding to the asked question and author/contextual data corresponding to the stored Q&A pair. For example, where a question is "what is the best auto body shop in the city?," a location context must match between the asked question and stored Q&A pair for the stored Q&A pair to be used to provide an answer. In some cases, multiple stored questions may match an asked question, in which case the stored Q&A pair with author and context information most closely matching the context and author information of the asked question can be selected.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
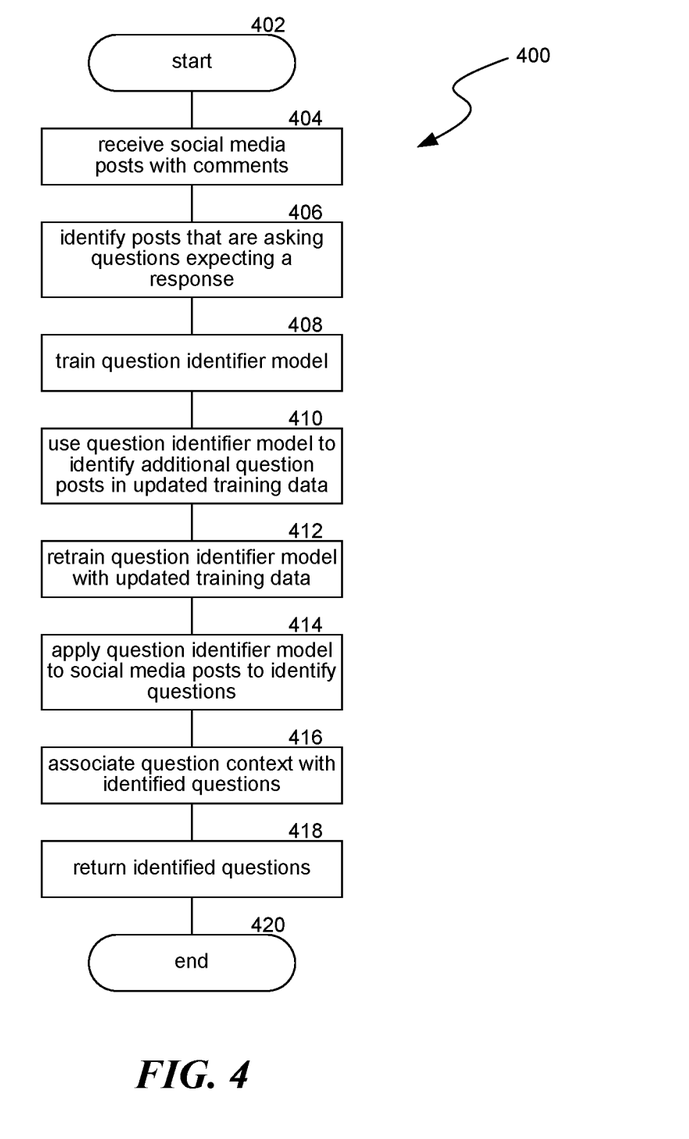
FIG. 4 is a flow diagram illustrating a process used in some implementations for identifying content items that contain a question.

FIG. 4 is a flow diagram illustrating a process 400 used in some implementations for identifying content items, such as a social media posts, that contain a question. Process 400 begins at block 402 and continues to block 404. At block 404, process 400 can receive social media posts that have each received one or more comments. At step 406, process 400 can identify which of the posts received at block 404 include a non-rhetorical question. In some implementations, the identifications of questions in the posts can be based on human tags added to posts. In some implementations, questions can be identified based on various questions indicators including: whether the post ends in a question mark, whether the post includes words indicating a question (e.g. who, what, where, when, why, which, how, does, can, etc.), or whether text in the post has a grammatical structure indicative of a question. In some implementations, questions can also be labeled with a question type, such as factual or recommendation. A factual type of question can be a question where the answer is not dependent upon the context or asker of the question. A recommendation type of question can be question where the answer is different for different users, in different areas, or in different contexts. In some implementations, a question type can be identified based on an identified subject of the question, whether the question matches a template for a particular question type, or whether the question identifies a particular context.

At block 408, process 400 can use the posts received at block 404, with the question labels identified at block 406, to train a model to identify questions in posts. A "model," as used herein, refers to a construct that is trained using training data to make predictions or provide probabilities for new data items, whether or not the new data items were included in the training data. For example, training data can include social media posts with an assigned classification for whether or not the post contains a question. Examples of models include: neural networks, support vector machines, decision trees, Parzen windows, Bayes, clustering, reinforcement learning, probability distributions, and others. In some implementations, the question model can be a neural network with multiple input nodes that receive representations of social media posts. The input nodes of the neural network can correspond to functions that receive the input and produce results. These results can be provided to one or more levels of intermediate nodes that each produce further results based on a combination of lower level node results. A weighting factor can be applied to the output of each node before the result is passed to the next layer node. At a final layer ("the output layer"), one or more nodes can produce a value classifying the input that, once the model is trained, can be used to identify questions in posts. At block 408, each of the posts can be provided to the model and the weighting factors can be adjusted to make the results from the output later more closely match the classification for whether or not that post includes a question.

At block 410, process 400 can use the model trained at block 408 to classify posts for whether or not they have a question. This can be a reclassification of the posts received at block 404 or this can be a classification of additional posts from a social media system. At block 412, process 400 can use the updated set of classifications identified at block 410 to re-train the question model. In some implementations, the question model trained at block 408 can be used in the remainder of process 400 without using that model to obtain new training data, skipping blocks 410 and 412. At block 414, process 400 can apply the trained question model to social media posts to identify the posts that contain a question.

In some implementations, the question model can identify, for posts that have a question, a question type. At block 416, process 400 can associate context data or data about an author for a question identified by the question model at block 414. In various implementations, context data can include when the question was provided, where the question was asked from, what type of device the question originated from, a virtual area the question was posted to, etc. Author data can include gender, age, date of birth, location (e.g. longitude/latitude, country, region, city, etc.) level of education, life stage, relationship status, first name, a model of devices typically used, languages identified as ones the user is facile with, occupation, a number of friends, which friends the user has, which friends-of-friends the user has, a number of friend requests the user has received, a number of subscribers to content produced by the user, a time the user created the content item, times the user typically accesses a social media website, whether the content item was from phone/computer, whether the user typically accesses a social media website from phone or a computer, level of activity on a social media website, or etc.

At block 418, process 400 can return the questions identified at block 414. In some implementations, the returned questions can be associated with the identified author or context data. In some implementations, the returned questions can be associated with the identified question type. Process 400 can then continue to block 420, where it ends.

Figure 5:
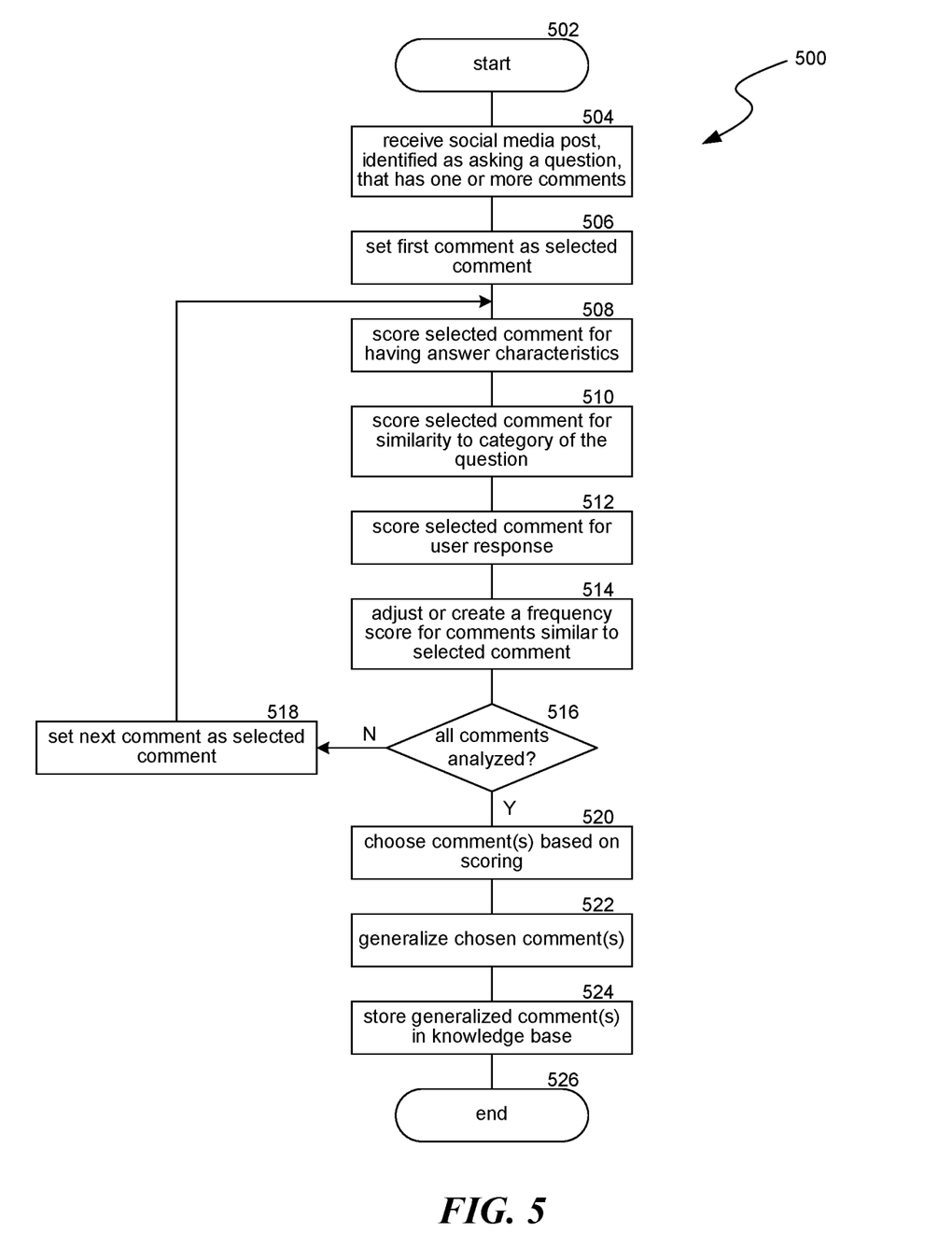
FIG. 5 is a flow diagram illustrating a process used in some implementations for determining an appropriate answer for a question identified in a content item.

FIG. 5 is a flow diagram illustrating a process 500 used in some implementations for determining an appropriate answer for a question identified in a content item. Process 500 begins at block 502 and continues to block 504. At block 504, process 500 can receive a social media post identified as including a question, such as through process 400. The received social media post can have received one or more comments from other users, which can be used as potential answers to the question in the post. At block 506, process 500 can set the first comment associated with the received post as a selected comment to be operated on by the loop between blocks 508-518.

At block 508, process 500 can compute an answer-type score for the selected comment. The answer-type score can be computed based on features of the comment such as whether the comment has a grammatical structure expected of answers and whether the comment has words or phrases commonly found in answers. For example, an answer to a recommendation type question often contain the phrase "I like" or "great," or has a structure corresponding to <noun>is<opinion word>.

At block 510, process 500 can assign a question similarity score to the selected comment. A question similarity score can identify whether a subject of the comment matches a category defined by the question. In some implementations, this can be done by finding overlapping words between the question and the selected comment. In some implementations, the question similarity score can be determined by determining a category for the question and then determining whether words in the selected comment fall within that category. For example, the question "where is the best dog park in Seattle" can be assigned the categories "location," "dogs," and "parks." A dictionary can be arranged into a hierarchy so that process 500 can determine whether words in the selected comment are in any of these categories. For example, the comment "my Labrador likes regrade park over on 3rd. Ave." can have a high question similarity score because it identifies Labrador which would fall under the category of dogs, Regrade Park under the category of parks, and 3rd Ave. under the category of location.

At block 512, process 500 can compute a comment score for the selected comment. The comment score can indicate how users, whether the question asker or other users, have reacted to the selected comment. Reactions can include "liking" the selected comment, commenting on the selected comment, sharing the selected comment, providing a rating for the selected comment, linking to the selected comment, etc. In some implementations, reactions by the question asker can be given greater weight than reactions by other users. In some implementations, certain types of reactions can have a greater effect on the comment score than other reactions. For example, in social media systems where a user can provide reactions such as: like, love, laugh, wow, sad, or angry, a like or wow can give a +1 to the comment score, a love can give a +2 to the comment score, and the sad or angry response can give a −1 to the comment score. In addition, a the effect of a comment on a selected comment can be weighted based on the words used in that comment. For example, where a question asker posts a question, receives a comment response, then comments on that response with words such as "thanks," "great," or "helpful," these keywords can indicate that the response is an answer to the original question.

At block 514, process 500 can compute a frequency score for the selected comment. The frequency score can be an indicator of how often a comment similar to the selected comment has been provided for a question similar to the question received at block 504. In some implementations, content items (e.g. questions and potential answers) can be identified as similar by matching keywords or by determining the subject of the content item and determining if previous content items have the same subject. In some implementations, content items can be identified as similar by mapping them into a vector space and identifying items as similar where the cosine difference between vectors is below a threshold value.

In some implementations, a selected comment can be disqualified from being an answer to the question for the post received at block 504 if any of the scores computed in blocks 508, 510, 512, or 514 is below corresponding exclude threshold value. In some implementations, a selected comment can be identified as being an answer to the question for the post received at block 504 if any of the scores computed in blocks 508, 510, 512, or 514 is above a corresponding include threshold value.

At block 516, process 500 can determine whether all the comments on the post received at block 504 have been analyzed by the loop between blocks 508-518; if not, process 500 continues to block 518; if so, process 500 continues to block 520. At block 518, process 500 can set the next comment associated with the received post as the selected comment to be operated on by the loop between blocks 508-518.

At block 520, process 500 can select one or more of the comments scored by the loop between blocks 508-518 as an answer to the question. This selection can be accomplished by computing a combined score for each comment based the scores computed in blocks 510-514, e.g. as an average or as a weighted average. In some implementations, comments with a combined score below a threshold can be excluded from being an answer to the question. In some implementations, the single highest scoring comment can be selected as the answer to the question. In some implementations, each comment with a score above a threshold can be selected to be paired with the question to be a Q&A pair. In some implementations where no comment received a sufficiently high combined score, the question can be disqualified from being included in the knowledge base.

At block 522, process 500 can generalize the content items in the Q&A pairs formed by the question received at block 504 and the comment answers selected at block 520. In some implementations, this can comprise removing personal information from the content items. In some implementations, this can include converting all or portions of the content items into links to social media entities. In some implementations, this can include computing a vector representation of either of the content items. In some implementations, this can include identifying and storing portions of the content items that match a particular template. In some implementations, the full version of the content items can be stored for later presentation to users, or for later generalization prior to display to other users.

At block 524, process 500 can store the Q&A pairs in a knowledge base. In some implementations, the Q&A pairs can be associated with context data about the question or the answer or information about the question asker or answer comment poster. Process 500 can then continue to block 526, where it ends.

Figure 6:
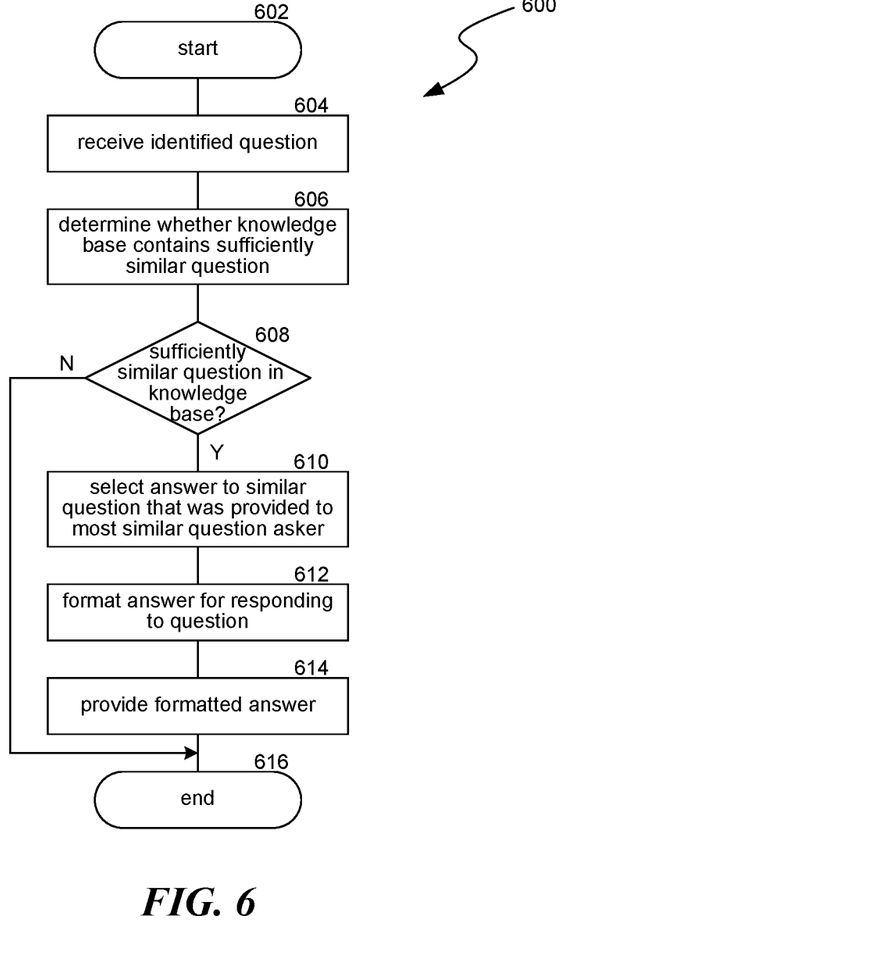
FIG. 6 is a flow diagram illustrating a process used in some implementations for responding to a question from a user.

FIG. 6 is a flow diagram illustrating a process 600 used in some implementations for responding to a question from a user. Process 600 begins at block 602 and continues to block 604. At block 604, process 600 can receive an identification of a question. In some implementations, the question can be received through a question response system, such as an artificial intelligence agent or digital personal assistant. In some implementations, the question can be identified from a social media post, which can be accomplished using the model trained at block 412. In some implementations, process 600 can also receive an identification of a user or user characteristics who asked the question. Author characteristics can include gender, age, date of birth, location (e.g. longitude/latitude, country, region, city, etc.) level of education, life stage, relationship status, first name, a model of devices typically used, languages identified as ones the user is facile with, occupation, a number of friends, which friends the user has, which friends-of-friends the user has, a number of friend requests the user has received, a number of subscribers to content produced by the user, a time the user created the content item, times the user typically accesses a social media website, whether the content item was from phone/computer, whether the user typically accesses a social media website from phone or a computer, level of activity on a social media website, or etc. In some implementations, process 600 can also receive information about a context of the asked question, such as the length of the question, time of day or day of week the question was asked, where the questions originated, etc.

At block 606, process 600 can search the knowledge base for questions sufficiently similar to the question identified at block 604 to provide the corresponding answer to the asking user. In some implementations, this matching process can be based on a document search of Q&A pairs in the knowledge base, e.g. using keywords from the question. In some implementations, the matching process can be performed by converting the question into a vector representation and comparing it to other stored question vector representations, e.g. using cosine distance. In some implementations, a similarity score between the question and Q&A pairs in the knowledge base can be computed and the highest scoring Q&A pair can be selected, provided that the similarity score is at least above a threshold. In some implementations, a qualification for a match between the identified question and a question in the knowledge base can be a required level of similarity between the author and/or context data of the received question and author and/or context data for stored Q&A pairs. In some implementations, this matching can include a requirement for an exact match between particular author or context data, such as location. For example, a recommendation type question looking for advice on picking a local service can require a match between a location associated with the question and a location associated with a selected Q&A pair.

In some implementations, when no match can be determined between the identified question and a Q&A pair in the knowledge base, the matching process can be repeated using a more general version of the identified question or by matching the identified question to more general answers. This can be accomplished where the automated response system can use a hierarchy to determine more generalized versions of questions or Q&A pairs. A hierarchy can define generalizations of terms and subjects which can be substituted for terms or subjects in a question when searching the knowledge base. For example, if the identified question is "where is the best fishing in Missoula, Montana?" the hierarchy can define a more general version of Missoula, Mont. to be a broader geographical area, such as "eastern Montana." The knowledge base may not have an answer for the original best fishing in Missoula question, but does has a Q&A pair answering the question for best fishing in eastern Montana, which can be selected. At block 608, process 600 can branch to block 610 if a sufficiently similar Q&A pair is found at block 606 and can branch to block 616 if no sufficiently similar Q&A pair is found at block 606.

In some cases, there can be multiple Q&A pairs identified at block 606 that are sufficiently similar to the received question. At block 610, process 600 can select the sufficiently similar question that has a question asker or context that is most similar to the question asker or context of the identified question.

At block 612, process 600 can format the selected Q&A pair for presentation as a response to the identified question. In various implementations, this formatting can include: generalizing the content of the Q&A pair as discussed above, removing private data from the Q&A pair, checking to make sure the user who is to receive the answer is permitted access to the data in the Q&A pair (e.g. where the answer is provided as a link to one or more social media entities, checking whether that user has permission to access/see those social media entities).

In some implementations, the answer from the selected Q&A pair can be provided with an explanation for why that answer was selected. For example, the answer can be explained as being the best answer for the user's current area, that the answer was provided based on a particular characteristic of the user such as age range, the answer can be provided with a clarification that an exact answer was not available and this more general answer is being provided instead, that the answer is being provided with a particular confidence level, etc. The formatted answer can be provided at block 614. Process 600 can then continue to block 616, where it ends.

In particular embodiments, training elements and other data, e.g. data from an online social network, may be associated with privacy settings. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, a social-networking system may send a request to the data store for the object. The request may identify the user associated with the request and may only be sent to the user if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. Although this disclosure describes enforcing privacy settings in a particular manner, this disclosure contemplates enforcing privacy settings in any suitable manner.

Some embodiments described herein make use of data or metrics that may include information voluntarily provided by one or more users. In such embodiments, data privacy may be protected in a number of ways.

For example, the user may be required to, or may voluntarily, opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for identifying a question and answer pair, comprising:
   determining, by a computer processor, that a social media post provided by a first user includes a question, wherein the social media post is associated with comments provided by at least one second user other than the first user;
   identifying a second question similar to the question based on a similarity between a question vector for the question and a question vector for the second question;
   selecting, from the comments associated with the social media post, an answer to the question, wherein selecting the answer is based on a combined score computed for the answer, wherein the combined score is based on:
      an answer-type score computed for the answer;
      a question similarity score computed for the answer;
      a comment score computed for the answer; and
      a frequency score computed for the answer based on a similarity between an answer vector for the answer and an answer vector for a stored answer to the second question;
   determining a context associated with the social media post or author characteristics associated with the first user;
   determining a type of the question by a question classifier, wherein the type comprises one of a recommendation type or a factual type;
   storing a version of the question and the selected answer in a knowledge base, wherein the stored version is associated with the determined context or the determined author characteristics and the determined type of the question; and
   generating abstracted versions of the question and the selected answer by mapping the question and the selected answer into a vector space based on a root node of a dependency structure for the question and a root node of a dependency structure for the selected answer, wherein the dependency structures comprise a respective plurality of nodes, wherein generating the abstracted versions of the question and selected answer further comprises:
      computing, for each node of the plurality of nodes, a respective vector in the vector space;
      selecting, as the vector in the vector space for the selected answer, the vector computed for the root node of the plurality of nodes for the dependency structure for the selected answer; and
      selecting, as the vector in the vector space for the question, the vector computed for the root node of the plurality of nodes for the dependency structure for the question;
   receiving, by the processor, a new question; and
   returning a question and answer pair from the knowledge base as a response to the new question.

2. The method of claim 1, wherein determining that the social media post includes the question comprises building the question classifier using training data labeled to indicate whether each item in the training data includes a question, wherein the type of the question is determined based on whether the question matches a template for the recommendation type or a template for the factual type.

3. The method of claim 2, wherein each training item in the training data is labeled based on qualifications including one or both of:
   whether the training item includes a question mark; or
   whether the training item uses keywords identified to correspond to questions.

4. The method of claim 1, wherein the question and answer pair is further stored with an identifier indicating the determined type of the question.

5. The method of claim 1, wherein the context associated with the social media post includes location data.

6. The method of claim 1, further comprising identifying a social media entity corresponding to the answer, and wherein the stored version of the answer comprises an indication of the social media entity corresponding to the answer.

7. The method of claim 1, wherein the combined score is based on at least the answer-type score, wherein the answer-type score indicates whether a grammatical structure of the answer corresponds to known answer grammatical structures and whether the answer contains known answer-type words.

8. The method of claim 1, wherein the combined score is based on at least the question similarity score, wherein the question similarity score indicates a level of similarity between words in the question and words in the answer, or identified concepts in the question and concepts in the answer.

9. The method of claim 1, wherein the combined score is based on at least the comment score, wherein the comment score indicates whether users have provided a positive reaction to the answer.

10. The method of claim 9, wherein computing the comment score includes weighting a reaction by the author of the question higher than reactions by other users and weighting each reaction based on a type of the reaction.

11. The method of claim 1, wherein the combined score is based on at least the frequency score.

12. A non-transitory computer-readable storage medium storing instructions that, when executed by a computing system, cause the computing system to perform operations for selecting an answer to a question, the operations comprising:
   identifying a second question similar to a question in a social media post based on a similarity between a question vector for the question and a question vector for the second question;
   selecting, from comments to the social media post, an answer to the question, wherein selecting the answer is based on a combined score computed for the answer based on a combination of:
      a question similarity score computed for the answer;
      a frequency score computed for the answer based on a similarity between an answer vector for the answer and an answer vector for a stored answer to the second question; and
      a comment score computed for the answer indicating how an author of the question responded to the answer and how multiple other users have responded to the answer;
   determining, by a question classifier, whether a type of the question comprises a recommendation type or a factual type;
   storing the selected answer and the determined type of the question in a knowledge base with an association to the question;
   generating abstracted versions of the question and the selected answer by mapping the question and the selected answer into a vector space based on a root node of a dependency structure for the question and a root node of a dependency structure for the selected answer, wherein the dependency structures comprise a respective plurality of nodes, wherein generating the abstracted versions of the question and selected answer further comprises:
      computing, for each node of the plurality of nodes, a respective vector in the vector space;
      selecting, as the vector in the vector space for the selected answer, the vector computed for the root node of the plurality of nodes for the dependency structure for the selected answer; and
      selecting, as the vector in the vector space for the question, the vector computed for the root node of the plurality of nodes for the dependency structure for the question;
   receiving a new question; and
   returning a question and answer pair from the knowledge base as a response to the new question.

13. The computer-readable storage medium of claim 12, wherein the operations further comprise, in response to identifying the question as a recommendation type question, storing, with an association to the selected answer, a context identified for the question or author characteristics identified for an author of the question, wherein the type of the question is determined based on whether the question matches a template for the recommendation type or a template for the factual type.

14. The computer-readable storage medium of claim 13, wherein the context identified for the question or the author characteristics identified for an author of the question comprise one or more of:
   a location associated with where the question was asked;
   an age of the author of the question;
   an education level of the author of the question;
   an occupation of the author of the question; or
   any combination thereof.

15. The computer-readable storage medium of claim 12, wherein the operations further comprise identifying a social media entity corresponding to the selected answer, and
   wherein storing the selected answer comprises storing an indication of the identified social media entity corresponding to the selected answer.

16. A automated question response system, comprising:
   a memory;
   one or more processors;
   a knowledge base comprising multiple question and answer pairs, wherein at least some of the question and answer pairs were selected by:
      using a question classifier trained to identify questions in social media posts associated with comments;
      identifying a second question similar to a question based on a similarity between a question vector for the question and a question vector for the second question;
      selecting, from the comments associated with the corresponding social media post, an answer to the question, wherein selecting the answer is based on a combined score computed for the answer, wherein the combined score is based on: a comment score computed for the answer, a frequency score computed for the answer, and a similarity score computed for the answer based on a similarity between an answer vector for the answer and an answer vector for a stored answer to the second question;
      determining a type of the question by the question classifier, wherein the type comprises one of a recommendation type or a factual type;
      storing a version of the question, the selected answer, a context of the corresponding social media post, and the determined type of the question in the knowledge base; and
      generating abstracted versions of the question and the selected answer by mapping the question and the selected answer into a vector space based on a root node of a dependency structure for the question and a root node of a dependency structure for the selected answer, wherein the dependency structures comprise a respective plurality of nodes, wherein generating the abstracted versions of the question and selected answer further comprises:
  computing, for each node of the plurality of nodes, a respective vector in the vector space;
  selecting, as the vector in the vector space for the selected answer, the vector computed for the root node of the plurality of nodes for the dependency structure for the selected answer; and
  selecting, as the vector in the vector space for the question, the vector computed for the root node of the plurality of nodes for the dependency structure for the question; and
an interface configured to receive an identification of a new question;
wherein the automated question response system is configured to respond to the new question by:
  identifying a question and answer pair from the knowledge base, wherein the question of the identified question and answer pair is within a threshold level of similarity to the new question; and
  providing, through the interface, the answer of the identified question and answer pair as a response to the new question.

17. The automated question response system of claim 16, wherein the comment score indicates whether users have provided a positive reaction to the answer, wherein the comment score is weighted based on a type of each provided reaction.

18. The automated question response system of claim 16, wherein the frequency score indicates a frequency with which similar answers have previously been identified as being provided for similar questions.

19. The automated question response system of claim 16, wherein at least some of the question and answer pairs identify a social media entity corresponding to the answer in that question and answer pair, wherein a context of the new question matches the context of the social media post corresponding to the answer in that question and answer pair.

* * * * *